US012275248B2

(12) United States Patent
Chikazawa

(10) Patent No.: US 12,275,248 B2

(45) Date of Patent: Apr. 15, 2025

(54) INKJET RECORDER

(71) Applicant: KONICA MINOLTA, INC., Tokyo (JP)

(72) Inventor: Satoshi Chikazawa, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 151 days.

(21) Appl. No.: 18/162,746

(22) Filed: Feb. 1, 2023

(65) Prior Publication Data

US 2023/0294406 A1 Sep. 21, 2023

(30) Foreign Application Priority Data

Mar. 16, 2022 (JP) ................................ 2022-041403

(51) Int. Cl.
*B41J 2/165* (2006.01)
*B41J 25/00* (2006.01)

(52) U.S. Cl.
CPC ....... *B41J 2/16538* (2013.01); *B41J 2/16508* (2013.01); *B41J 2/16517* (2013.01); *B41J 2002/1655* (2013.01); *B41J 2025/008* (2013.01)

(58) Field of Classification Search
CPC ......................... B41J 2/16538; B41J 2/16508; B41J 2/16517; B41J 2002/1655; B41J 2025/008
See application file for complete search history.

(56) References Cited

U.S. PATENT DOCUMENTS 10,457,052 B2 * 10/2019 Tsubaki ............... B41J 2/16585

FOREIGN PATENT DOCUMENTS

JP 2013230644 A 11/2013

* cited by examiner

*Primary Examiner* — Geoffrey S Mruk
(74) *Attorney, Agent, or Firm* — Buchanan Ingersoll & Rooney PC

(57) ABSTRACT

An inkjet recorder includes: a drum that is rotatable about a rotation axis and conveys a recording medium; a head unit including an ejection surface that ejects ink that forms an image on the medium conveyed to the drum, the head unit being movable between a recording position at which the ejection surface faces the drum and a cleaning position separated from the recording position in a direction parallel to the rotation axis; and a cleaning unit that is disposed at a position being adjacent to the drum in the direction parallel to the rotation axis and facing the ejection surface of the head unit located at the cleaning position, and cleans the ejection surface, wherein the head unit includes heads having the ejection surface, the cleaning unit includes a cleaning member, the cleaning member has a cleaning surface, and the cleaning surface cleans the ejection surface.

12 Claims, 7 Drawing Sheets

INKJET RECORDER

The entire disclosure of Japanese patent Application No. 2022-041403, filed on Mar. 16, 2022, is incorporated herein by reference in its entirety.

BACKGROUND

Technological Field

The present disclosure relates to an inkjet recorder.

Description of the Related Art

Conventionally, an inkjet recorder that forms an image by ejecting ink onto a recording medium held on a circumferential surface of a drum is known. For example, Japanese Unexamined Patent Publication No. 2013-230644 discloses an inkjet recorder including a drum, a head unit, and a sheet mechanism. The head unit includes a base and a plurality of heads held by the base. The plurality of heads is arranged along a direction parallel to a rotation axis of the drum. The head unit is mounted on a carriage and movable along the direction parallel to the rotation axis of the drum. The sheet mechanism holds a sheet capable of absorbing ink from a nozzle surface of the head. The sheet cleans the nozzle surface of the head while rotating in the same direction as a rotation direction of the drum.

In the inkjet recorder disclosed in Japanese Unexamined Patent Publication No. 2013-230644, in order to collectively clean the plurality of heads arranged in a row, it is necessary to set a length of the sheet in the direction parallel to the rotation axis to be greater than or equal to a length of the head unit in the direction parallel to the rotation axis, and thus the entire recorder is increased in size.

In order to avoid an increase in size of the recorder, it is conceivable to make the length of the sheet mechanism in the direction parallel to the rotation axis smaller than the length of the head unit in the direction parallel to the rotation axis. However, in that case, in order to complete the cleaning of all the heads included in the same row, it is necessary to repeat moving the head unit along the direction parallel to the rotation axis and cleaning some of the plurality of heads with the sheet. Therefore, time required for cleaning all the heads included in the same row becomes longer.

SUMMARY

An object of the present disclosure is to provide an inkjet recorder capable of reducing time required for cleaning a head.

To achieve the abovementioned object, according to an aspect of the present invention, an inkjet recorder reflecting one aspect of the present invention comprises: a drum that is rotatable about a rotation axis and conveys a recording medium; a head unit including an ejection surface that ejects ink that forms an image on the recording medium conveyed to the drum, the head unit being movable between a recording position at which the ejection surface faces the drum in a radial direction of the drum and a cleaning position separated from the recording position in a direction parallel to the rotation axis; and a cleaning unit that is disposed at a position being adjacent to the drum in the direction parallel to the rotation axis and facing the ejection surface of the head unit located at the cleaning position, and cleans the ejection surface, wherein the head unit includes a plurality of heads arranged side by side along the direction parallel to the rotation axis, each of the plurality of heads has the ejection surface, the cleaning unit includes a cleaning member rotatable about an orthogonal axis orthogonal to the rotation axis, the cleaning member has a cleaning surface that is provided at a position facing the ejection surface and cleans the ejection surface while rotating around the orthogonal axis, and the cleaning surface cleans the ejection surface while being in contact with the ejection surface of the head unit moving between the recording position and the cleaning position.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
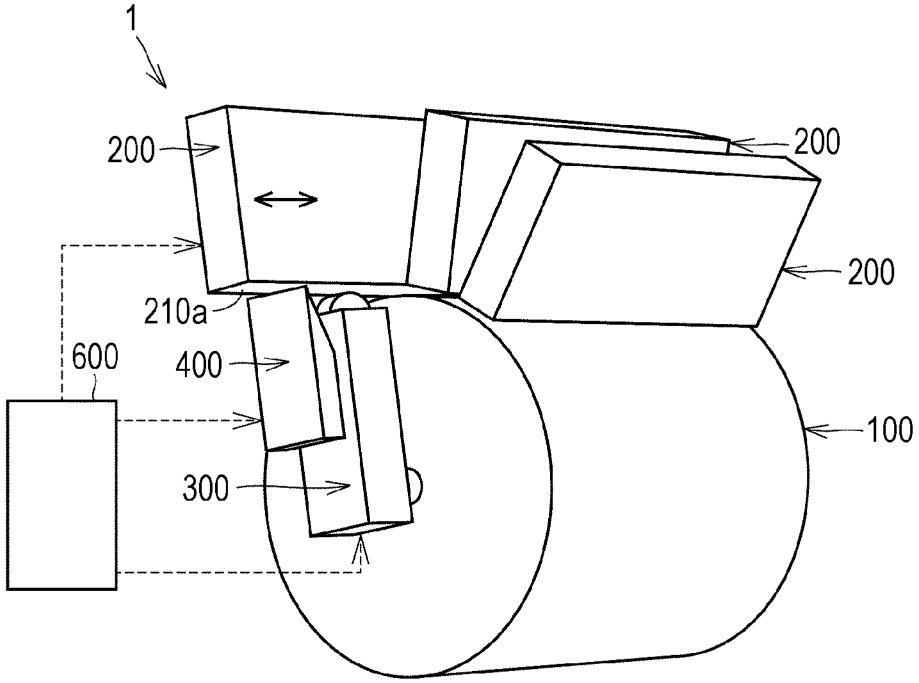
FIG. 1 is a perspective view schematically showing an overall configuration of an inkjet recorder according to an embodiment of the present disclosure.

Hereinafter, one or more embodiments of the present invention will be described with reference to the drawings. However, the scope of the invention is not limited to the disclosed embodiments. In the drawings referred to below, the same or corresponding members are denoted by the same reference numerals.

Figure 2:
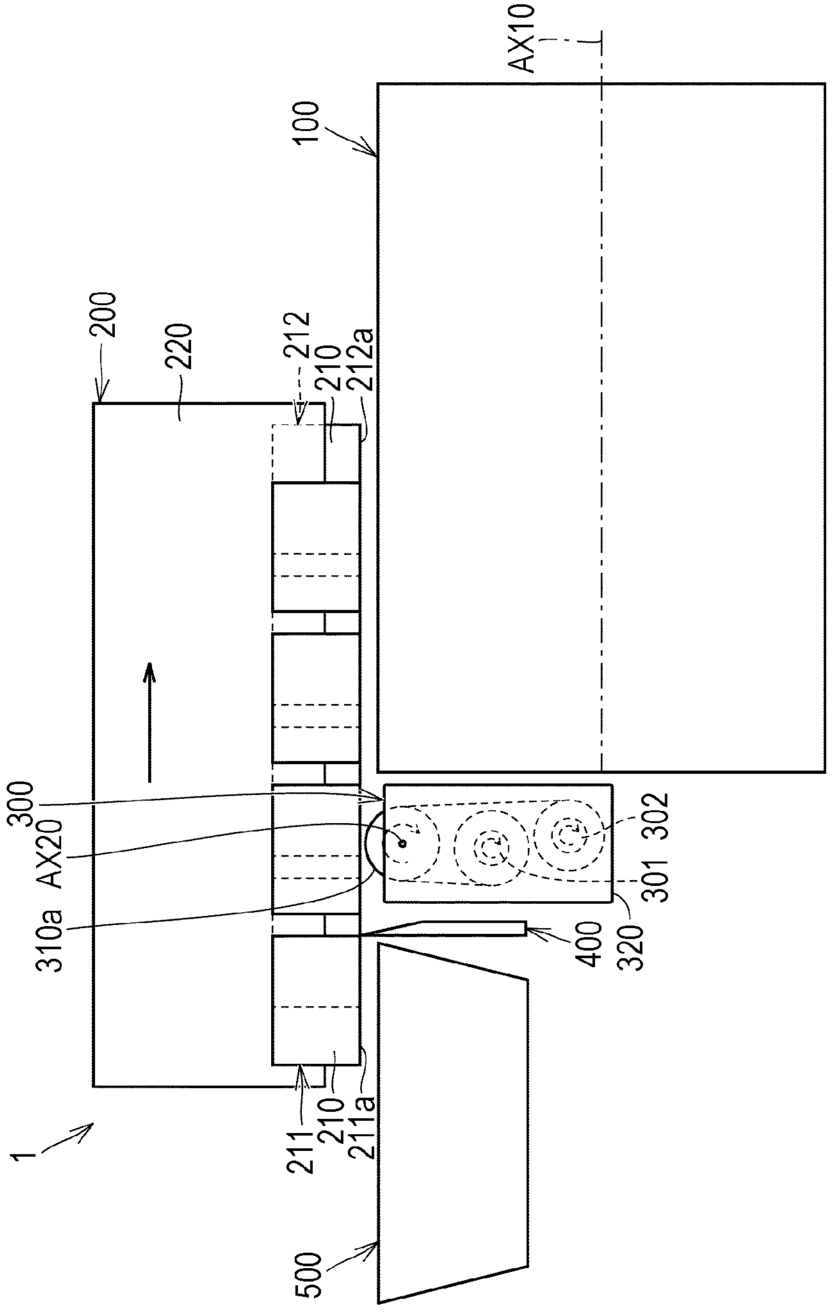
FIG. 2 is a sectional view schematically showing the inkjet recorder.

FIG. 1 is a perspective view schematically showing an overall configuration of an inkjet recorder according to an embodiment of the present disclosure. FIG. 2 is a sectional view schematically showing the inkjet recorder. An inkjet recorder 1 is applicable to multifunctional peripherals (MFP) having a plurality of functions such as a copy function, a facsimile function, a printer function, and a scanner function.

As shown in FIGS. 1 and 2, the inkjet recorder 1 includes a drum 100, a plurality of head units 200, a cleaning unit 300, another cleaning unit 400, a waste ink receiver 500, and a controller 600.

The drum 100 is rotatable about a rotation axis AX10 (see FIG. 2). The drum 100 can convey a recording medium (paper or the like) (not shown). Specifically, the drum 100 has a cylindrical circumferential surface 110, and can convey the recording medium while holding the recording medium on the circumferential surface 110 by a method such as suction.

Each of the head units 200 is a unit that ejects ink for forming an image on the recording medium conveyed to the drum 100. Each of the plurality of head units 200 ejects ink having colors of yellow (Y), magenta (M), cyan (C), and black (K) onto the recording medium. Each of the head units 200 includes a plurality of heads 210 and a carriage 220.

Figure 4:
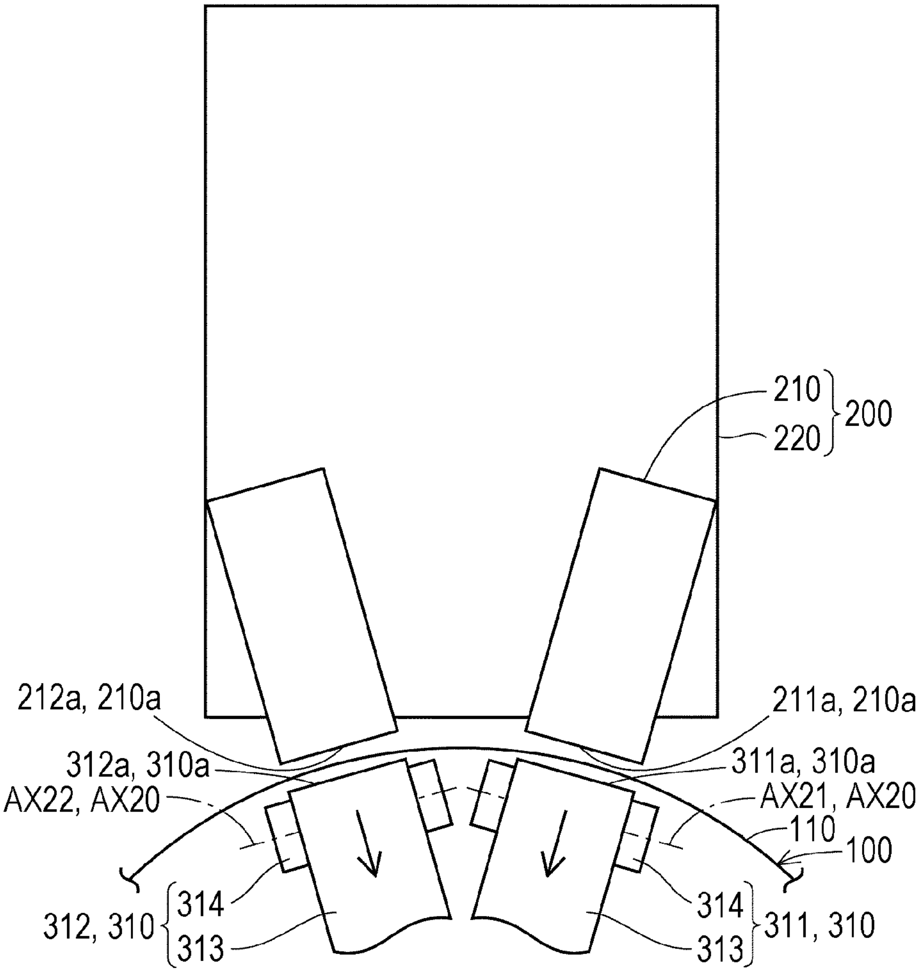
FIG. 4 is a diagram schematically showing a relationship between a head and a cleaning surface.

As shown in FIG. 2, each head unit 200 includes a first head group 211 and a second head group 212. Each of the head groups 211 and 212 includes the plurality of (for example, four) heads 210 arranged side by side along a direction parallel to the rotation axis AX10. As shown in FIG. 4, the first head group 211 and the second head group 212 are disposed at positions spaced apart from each other in a circumferential direction of the drum 100. In a plan view (in a state viewed from above in FIG. 2), the heads 210 included in the first head group 211 and the heads 210 included in the second head group 212 are arranged in a staggered manner.

Each head 210 has an ejection surface 210*a* for ejecting ink. Hereinafter, the ejection surface 210*a* of the head 210 included in the first head group 211 may be referred to as a first ejection surface 211*a*, and the ejection surface 210*a* of the head 210 included in the second head group 212 may be referred to as a second ejection surface 212*a*. As shown in FIG. 4, the first ejection surface 211*a* and the second ejection surface 212*a* face the circumferential surface 110 in a radial direction of the drum 100.

The carriage 220 holds the plurality of heads 210. The carriage 220 is movable between a recording position and a cleaning position along a direction parallel to the rotation axis AX10 while holding the plurality of heads 210. The recording position is a position at which the ejection surface 210*a* faces the circumferential surface 110 of the drum 100 in the radial direction of the drum 100. The cleaning position is a position separated from the recording position in the direction parallel to the rotation axis AX10. Specifically, the cleaning position is a position at which each ejection surface 210*a* does not face the drum 100 in the radial direction of the drum 100 and is separated from the drum 100 in the direction parallel to the rotation axis AX10.

The cleaning unit 300 is a unit capable of cleaning each ejection surface 210*a*. The cleaning unit 300 is disposed at a position being adjacent to the drum 100 in a direction parallel to the rotation axis AX10 and facing the ejection surface 210*a* of the head unit 200 located at the cleaning position. As shown in FIGS. 1 and 2, a length of the cleaning unit 300 in the direction parallel to the rotation axis AX10 is smaller than a length of the head unit 200 in the direction parallel to the rotation axis AX10. The length of the cleaning unit 300 in the direction parallel to the rotation axis AX10 is, for example, about the same as a length of the head 210.

Figure 3:
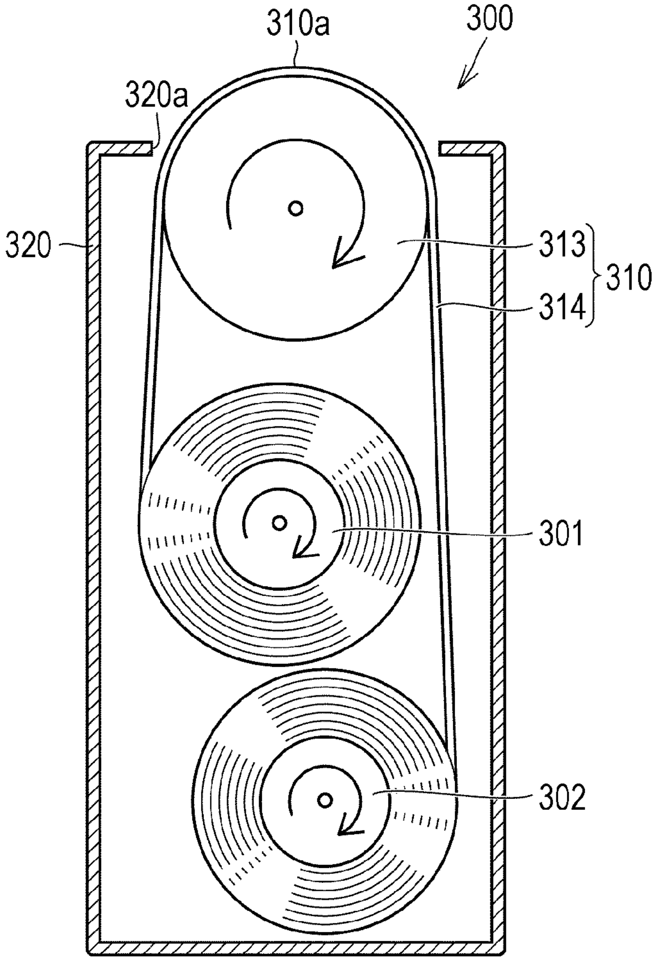
FIG. 3 is a sectional view of a cleaning unit.

As shown in FIG. 3, the cleaning unit 300 includes a cleaning member 310 and a housing 320.

The cleaning member 310 is rotatable about an orthogonal axis AX20 orthogonal to the rotation axis AX10. The cleaning member 310 has a cleaning surface 310*a* formed at a position facing the ejection surface 210*a*. The cleaning surface 310*a* includes an outer peripheral surface of the cleaning member 310. The cleaning surface 310*a* cleans the ejection surface 210*a* while rotating about the orthogonal axis AX20. Specifically, the cleaning surface 310*a* cleans the ejection surface 210*a* while being in contact with the ejection surface 210*a* of the head unit 200 moving between the recording position and the cleaning position.

In the present embodiment, the cleaning member 310 includes a first cleaning roller 311 and a second cleaning roller 312, and the cleaning surface 310*a* includes a first cleaning surface 311*a* including an outer peripheral surface of the first cleaning roller 311 and a second cleaning surface 312*a* including an outer peripheral surface of the second cleaning roller 312. The first cleaning roller 311 and the second cleaning roller 312 are rotatable independently of each other.

The first cleaning roller 311 can clean the first ejection surface 211*a*. The first cleaning roller 311 is rotatable about a first orthogonal axis AX21 (see FIG. 4) as the orthogonal axis AX20. The first orthogonal axis AX21 is a direction orthogonal to both a direction in which the first ejection surface 211*a* and the circumferential surface 110 of the drum 100 face each other and the rotation axis AX10. The first cleaning roller 311 is movable between a clean position at which the first cleaning surface 311*a* is in contact with the first ejection surface 211*a* and a retract position at which the first cleaning surface 311*a* is separated from the first ejection surface 211*a*.

The second cleaning roller 312 can clean the second ejection surface 212*a*. The second cleaning roller 312 is rotatable about a second orthogonal axis AX22 (see FIG. 4) as the orthogonal axis AX20. The second orthogonal axis AX22 is a direction orthogonal to both a direction in which the second ejection surface 212*a* and the circumferential surface 110 of the drum 100 face each other and the rotation axis AX10. The second cleaning roller 312 is movable between a clean position at which the second cleaning surface 312*a* is in contact with the second ejection surface 212*a* and a retract position at which the second cleaning surface 312*a* is separated from the second ejection surface 212*a*.

As shown in FIG. 4, in the present embodiment, each of the first cleaning roller 311 and the second cleaning roller 312 includes a sheet member 313 and a conveying roller 314.

The sheet member 313 has a sheet shape and can absorb ink. The sheet member 313 can wipe off the ink adhered to the ejection surface 210*a*.

The conveying roller 314 can convey the sheet member 313. The conveying roller 314 of the first cleaning roller 311 is rotatable about the first orthogonal axis AX21. The conveying roller 314 of the second cleaning roller 312 is rotatable about the second orthogonal axis AX22.

In a state where a part of the cleaning member 310 is exposed, the housing 320 accommodates the remaining part of the cleaning member 310. The housing 320 has an opening 320*a* through which a part of the cleaning member 310 is exposed. In the present embodiment, a part of the first cleaning roller 311 and a part of the second cleaning roller 312 are exposed from the opening 320*a*. The part of the first cleaning roller 311 exposed from the opening 320*a* constitutes the first cleaning surface 311*a*, and the part of the second cleaning roller 312 exposed from the opening 320*a* constitutes the second cleaning surface 312*a*.

In the housing 320, a feeding roller 301 that feeds out the sheet member 313 and a winding roller 302 that winds up the sheet member 313 having cleaned the ejection surface 210*a* are accommodated. The feeding roller 301, the winding roller 302, and the cleaning rollers 311 and 312 are driven by a motor (not shown).

The another cleaning unit 400 cleans the ejection surface 210*a*. As shown in FIGS. 1 and 2, the another cleaning unit 400 is disposed at a position adjacent to the cleaning unit 300 in the direction parallel to the rotation axis AX10. Specifically, the another cleaning unit 400 is disposed on the side opposite to the side on which the drum 100 is disposed with respect to the cleaning unit 300 in the direction parallel to the rotation axis AX10. The another cleaning unit 400 includes a cleaning blade having a plate shape. The another cleaning unit 400 is elastically deformable. The another cleaning unit 400 is movable between a clean position at which a tip of the cleaning blade is in contact with the ejection surface 210*a* and a retract position at which the tip of the cleaning blade is separated from the ejection surface 210*a*.

The waste ink receiver 500 receives waste ink discharged from each head 210. The waste ink receiver 500 is open upward. As shown in FIG. 2, the waste ink receiver 500 is disposed on the side opposite to the side where the cleaning unit 300 is disposed with respect to the another cleaning unit 400 in the direction parallel to the rotation axis AX10.

The controller 600 controls the head unit 200, the cleaning unit 300, and the another cleaning unit 400. Hereinafter, an example of a flow of the controller 600 when the ejection surface 210*a* of each head 210 is cleaned will be described.

When the ejection surface 210*a* of each head 210 is cleaned, the controller 600 first moves the head unit 200 from the recording position to the cleaning position. At this time, the cleaning rollers 311 and 312 and the another cleaning unit 400 are located at the retract positions.

Next, the controller 600 causes the waste ink receiver 500 to discharge the ink from each head 210.

Subsequently, the controller 600 performs an operation of moving the cleaning rollers 311 and 312 and the another cleaning unit 400 to the clean positions, an operation of moving the head unit 200 from the cleaning position toward the recording position, and an operation of rotating the cleaning rollers 311 and 312 so that a peripheral speed of the cleaning surfaces 311*a* and 312*a* becomes equal to a moving speed of the head unit 200.

By the above operations, the another cleaning unit 400 wipes each ejection surface 210*a* to remove the ink adhered to each ejection surface 210*a*. Thereafter, the first cleaning surface 311*a* of the first cleaning roller 311 continuously absorbs the ink adhered to the first ejection surface 211*a* of each head 210 included in the first head group 211, and the second cleaning surface 312*a* of the second cleaning roller 312 continuously absorbs the ink adhered to the second ejection surface 212*a* of each head 210 included in the second head group 212.

As described above, in the inkjet recorder 1 according to the present embodiment, the first cleaning roller 311 rotates about the first orthogonal axis AX21, and the second cleaning roller 312 rotates about the second orthogonal axis AX22. Therefore, by rotating the cleaning rollers 311 and 312 while moving the head unit 200 from the cleaning position toward the recording position, each ejection surface 210*a* of the plurality of heads 210 (each head 210 included in the first head group 211 and each head 210 included in the second head group 212) arranged along the direction parallel to the rotation axis AX10 can be continuously cleaned by the cleaning surface 311*a* and 312*a* without stopping the head unit 200 midway from the cleaning position toward the recording position. Accordingly, time required for cleaning the head 210 is reduced.

Furthermore, the control by the controller 600 when each ejection surface 210*a* is cleaned is an operation of moving the head unit 200 from the cleaning position toward the recording position and an operation of rotating the cleaning rollers 311 and 312. Thus, the control is simplified.

Since the length of the cleaning unit 300 in the direction parallel to the rotation axis AX10 is smaller than the length of the head unit 200 in the direction parallel to the rotation axis AX10, the size of the inkjet recorder 1 in the direction parallel to the rotation axis AX10 is reduced.

Figure 5:
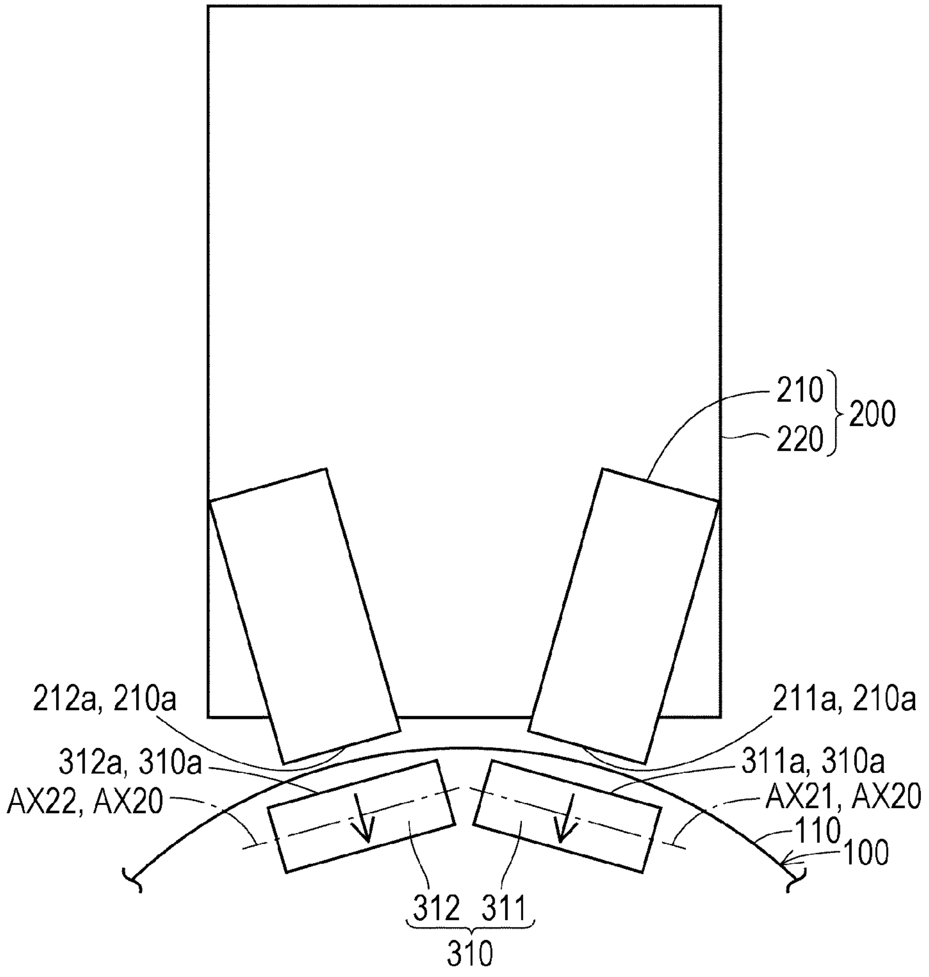
FIG. 5 is a diagram showing a modification of a cleaning section.

In the above embodiment, for example, as shown in FIG. 5, the first cleaning roller 311 and the second cleaning roller 312 may include a material capable of absorbing ink. For example, the first cleaning roller 311 and the second cleaning roller 312 may include sponge rollers.

Figure 6:
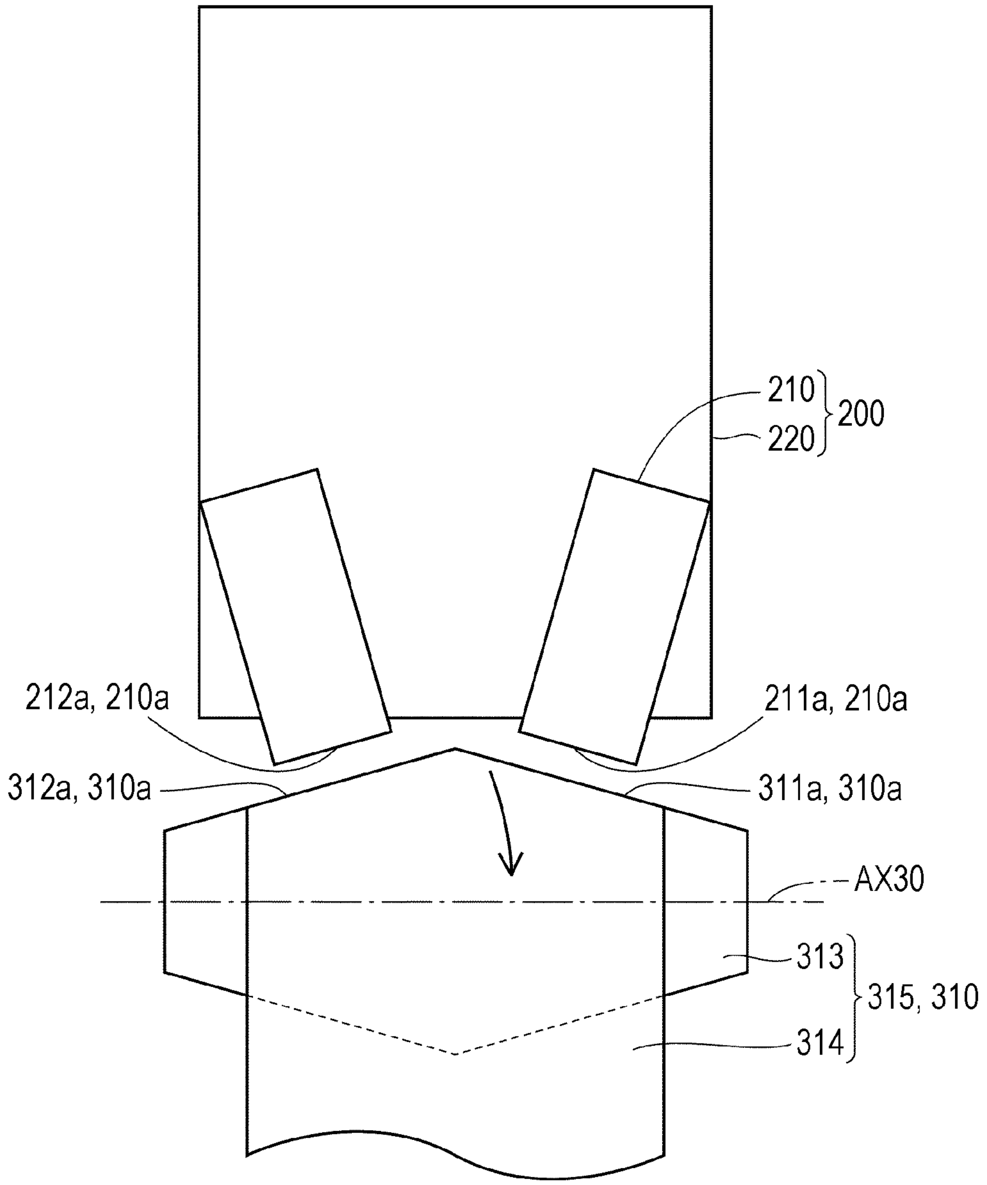
FIG. 6 is a diagram showing a modification of the cleaning section.
Figure 7:
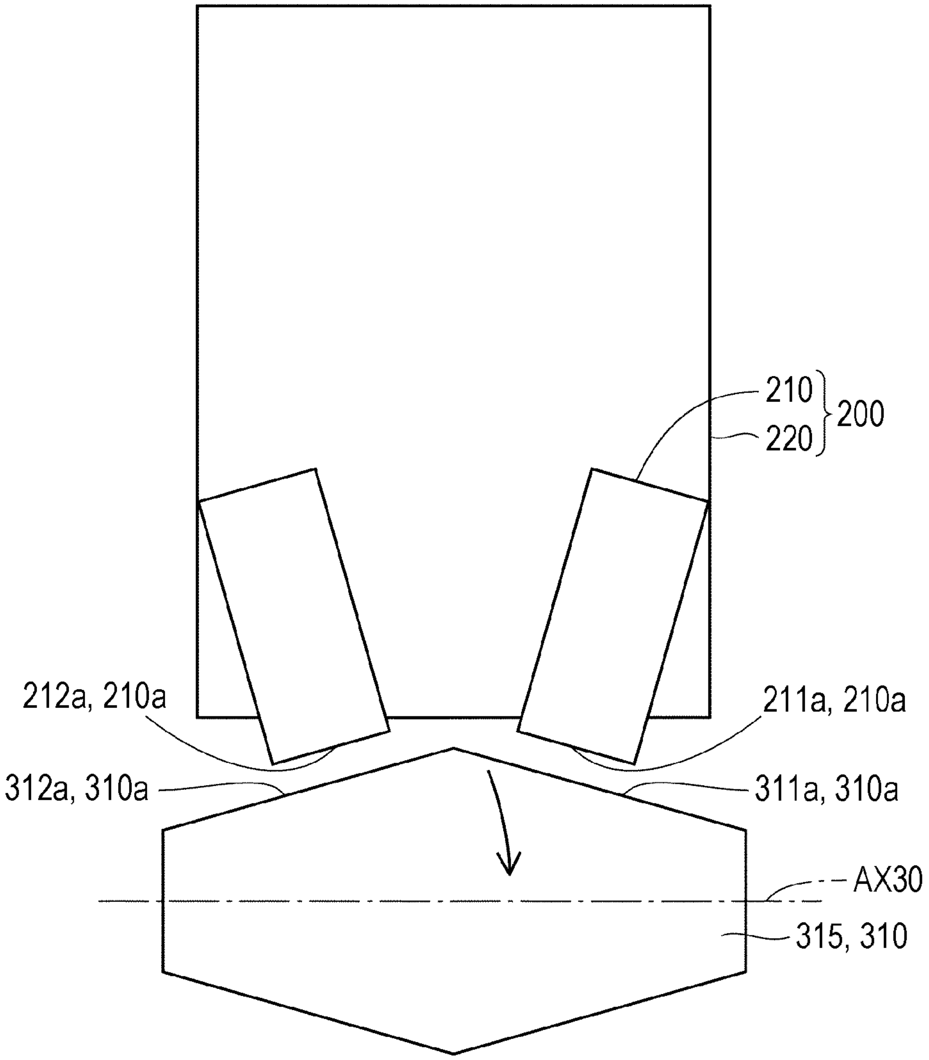
FIG. 7 is a diagram showing a modification of the cleaning section.

As shown in FIGS. 6 and 7, the cleaning member 310 may include a single cleaning roller 315 including the first cleaning surface 311*a* and the second cleaning surface 312*a*.

In an example shown in FIG. 6, the cleaning roller 315 includes a single sheet member 313 including the first cleaning surface 311*a* and the second cleaning surface 312*a*, and a single conveying roller 314. The single conveying roller 314 is rotatable about an orthogonal axis AX30 orthogonal to both the direction connecting the rotation axis AX10 and the head unit 200 and the rotation axis AX10. The single conveying roller 314 has a shape gradually reducing in diameter from a center toward outside in a direction parallel to the orthogonal axis AX30.

In an example shown in FIG. 7, the cleaning roller 315 includes a material capable of absorbing ink. For example, the cleaning roller 315 may include a sponge roller. The cleaning roller 315 is rotatable about the orthogonal axis AX30.

It is understood by those skilled in the art that the exemplary embodiment described above is a specific example of the following aspects.

An inkjet recorder according to the above embodiment includes a drum that is rotatable about a rotation axis and conveys a recording medium, a head unit including an ejection surface that ejects ink that forms an image on the recording medium conveyed to the drum, the head unit being movable between a recording position at which the ejection surface faces the drum in a radial direction of the drum and a cleaning position separated from the recording position in a direction parallel to the rotation axis, and a cleaning unit that is disposed at a position being adjacent to the drum in a direction parallel to the rotation axis and facing the ejection surface of the head unit located at the cleaning position, and cleans the ejection surface, in which the head unit includes a plurality of heads arranged side by side along a direction parallel to the rotation axis, each of the plurality of heads has the ejection surface, the cleaning unit includes a cleaning member rotatable about an orthogonal axis orthogonal to the rotation axis, the cleaning member has a cleaning surface that is provided at a position facing the ejection surface and cleans the ejection surface while rotating around the orthogonal axis, and the cleaning surface cleans the ejection surface while being in contact with the ejection surface of the head unit moving between the recording position and the cleaning position.

In this inkjet recorder, since the cleaning member rotates about the orthogonal axis, by rotating the cleaning member while moving the head unit from the cleaning position toward the recording position, each ejection surface of the plurality of heads arranged along the direction parallel to the rotation axis can be continuously cleaned by the cleaning surface without stopping the head unit midway from the cleaning position toward the recording position. Accordingly, the time required for cleaning the heads is reduced.

The length of the cleaning unit in the direction parallel to the rotation axis is preferably smaller than the length of the head unit in the direction parallel to the rotation axis.

In this way, a dimension of the inkjet recorder in the direction parallel to the rotation axis is reduced.

The head unit may further include a plurality of other heads arranged at a position spaced apart from the plurality of heads in a circumferential direction of the drum and arranged side by side along the direction parallel to the rotation axis Each of the plurality of heads has a first ejection surface facing the drum as the ejection surface, and each of the plurality of other heads has a second ejection surface facing the drum as the ejection surface. The cleaning surface includes a first cleaning surface capable of cleaning the first ejection surface, and a second cleaning surface capable of cleaning the second ejection surface.

In this case, the cleaning member may include a first cleaning roller including the first cleaning surface and a second cleaning roller including the second cleaning surface. The first cleaning roller is rotatable about a first orthogonal axis as the orthogonal axis, the first orthogonal axis being orthogonal to both a direction in which the first ejection surface and the drum face each other and the rotation axis, and the second cleaning roller is rotatable about a second orthogonal axis as the orthogonal axis, the second orthogonal axis being orthogonal to both a direction in which the second ejection surface and the drum face each other and the rotation axis.

In this aspect, the first cleaning surface effectively cleans the first ejection surface, and the second cleaning surface effectively cleans the second ejection surface.

The first cleaning roller and the second cleaning roller may be rotatable independently of each other.

The cleaning member may include a single cleaning roller including the first cleaning surface and the second cleaning surface. The orthogonal axis is orthogonal to both a direction connecting the rotation axis and the head unit and the rotation axis.

In this aspect, both the first cleaning surface and the second cleaning surface are effectively cleaned by rotating the single cleaning roller about the orthogonal axis.

The cleaning member may include a material capable of absorbing the ink. The cleaning surface includes an outer peripheral surface of the cleaning member.

Alternatively, the cleaning member may include a sheet member that has a sheet shape and absorbs the ink, and a conveying roller that conveys the sheet member.

The inkjet recorder may further include another cleaning unit that is disposed at a position adjacent to the cleaning unit in the direction parallel to the rotation axis and cleans the ejection surface.

In this aspect, the ejection surface is more reliably cleaned.

In this case, the another cleaning unit preferably includes an elastically deformable blade.

Although embodiments of the present invention have been described and illustrated in detail, the disclosed embodiments are made for purposes of illustration and example only and not limitation. The scope of the present invention should be interpreted by terms of the appended claims, and it is intended that meanings equivalent to the claims and all modifications within the scope are included.

What is claimed is:

1. An inkjet recorder comprising:

a drum that is rotatable about a rotation axis and conveys a recording medium;

a head unit including an ejection surface that ejects ink that forms an image on the recording medium conveyed to the drum, the head unit being movable between a recording position at which the ejection surface faces the drum in a radial direction of the drum and a cleaning position separated from the recording position in a direction parallel to the rotation axis; and a housing, the housing including a cleaning unit that is disposed at a position being adjacent to the drum in the direction parallel to the rotation axis and facing the ejection surface of the head unit located at the cleaning position, and cleans the ejection surface, wherein the head unit includes a plurality of heads arranged side by side along the direction parallel to the rotation axis, each of the plurality of heads has the ejection surface, the cleaning unit includes a cleaning member rotatable about an orthogonal axis orthogonal to the rotation axis, the cleaning member has a cleaning surface that is provided at a position facing the ejection surface and cleans the ejection surface while rotating around the orthogonal axis, and the cleaning surface cleans the ejection surface while being in contact with the ejection surface of the head unit moving between the recording position and the cleaning position; and wherein a length of the housing of the cleaning unit in the direction parallel to the rotation axis is smaller than a length of the head unit in the direction parallel to the rotation axis.

2. The inkjet recorder according to claim 1, wherein the head unit further includes a plurality of other heads arranged at a position spaced apart from the plurality of heads in a circumferential direction of the drum and arranged side by side along the direction parallel to the rotation axis, each of the plurality of heads has, as the ejection surface, a first ejection surface facing the drum, each of the plurality of other heads has, as the ejection surface, a second ejection surface facing the drum, and the cleaning surface has a first cleaning surface that cleans the first ejection surface and a second cleaning surface that cleans the second ejection surface.

3. The inkjet recorder according to claim 2, wherein the cleaning member includes a first cleaning roller including the first cleaning surface and a second cleaning roller including the second cleaning surface, the first cleaning roller is rotatable about a first orthogonal axis as the orthogonal axis, the first orthogonal axis being orthogonal to both a direction in which the first ejection surface and the drum face each other and the rotation axis, and the second cleaning roller is rotatable about a second orthogonal axis as the orthogonal axis, the second orthogonal axis being orthogonal to both a direction in which the second ejection surface and the drum face each other and the rotation axis.

4. The inkjet recorder according to claim 3, wherein the first cleaning roller and the second cleaning roller are rotatable independently of each other.

5. The inkjet recorder according to claim 2, wherein the cleaning member includes a single cleaning roller including the first cleaning surface and the second cleaning surface, and the orthogonal axis is orthogonal to both a direction connecting the rotation axis and the head unit and the rotation axis.

6. The inkjet recorder according to claim 1, wherein the cleaning member includes a material that absorbs the ink, and the cleaning surface includes an outer peripheral surface of the cleaning member.

7. The inkjet recorder according to claim 1, wherein the cleaning member includes a sheet member that has a sheet shape and absorbs the ink, and a conveying roller that conveys the sheet member.

8. The inkjet recorder according to claim 1, further comprising another cleaning unit that is disposed at a position adjacent to the cleaning unit in the direction parallel to the rotation axis and cleans the ejection surface.

9. The inkjet recorder according to claim 8, wherein the another cleaning unit includes an elastically deformable blade.

10. The inkjet recorder of claim 8, further comprising:

a waste ink receiver configured to receive waste ink discharged from the each of the plurality of heads, and wherein the waste ink receiver is disposed on a side opposite to a side where the cleaning unit is disposed with respect to the another cleaning unit.

11. The inkjet recorder of claim 1, wherein the length of the housing of the cleaning unit in the direction parallel to the rotation axis is about the same as a length of one head of the plurality of heads of the head unit.

12. The inkjet recorder of claim 1, further comprising:

a waste ink receiver configured to receive waste ink discharged from the each of the plurality of heads.

* * * * *